(No Model.)　　　　　　　　　　　　　　　　4 Sheets—Sheet 1.
R. P. WALSH.
CABLE RAILWAY.
No. 360,742.　　　　　　　　Patented Apr. 5, 1887.
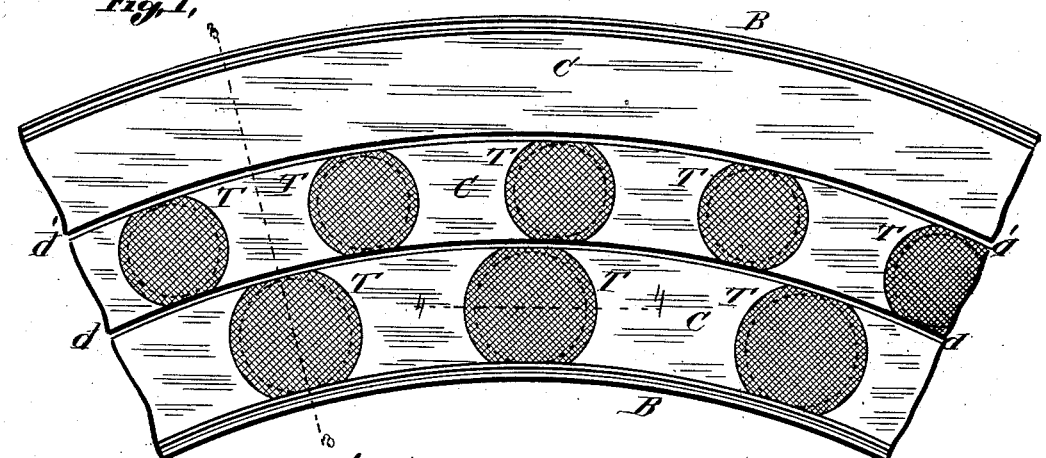
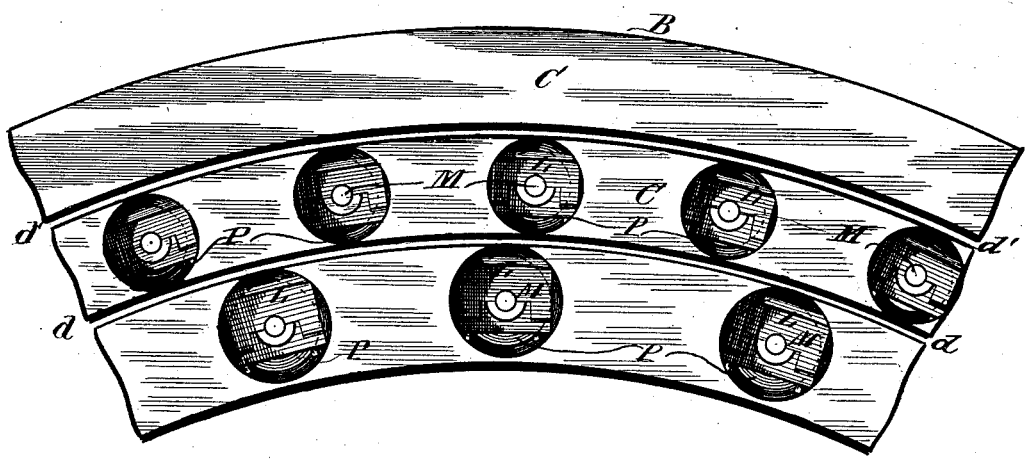
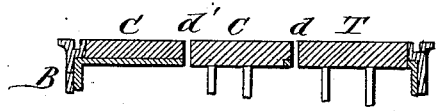
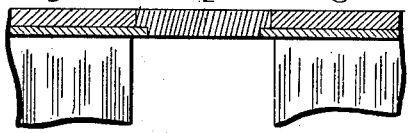
Attest:　　　　　　　　　　　　Inventor:
H. S. Knight　　　　　　　　　Richard P. Walsh.
Edward Starr　　　　　　　　By Knight Bro.
　　　　　　　　　　　　　　　　　Attys.

(No Model.) 4 Sheets—Sheet 2.
R. P. WALSH.
CABLE RAILWAY.
No. 360,742. Patented Apr. 5, 1887.
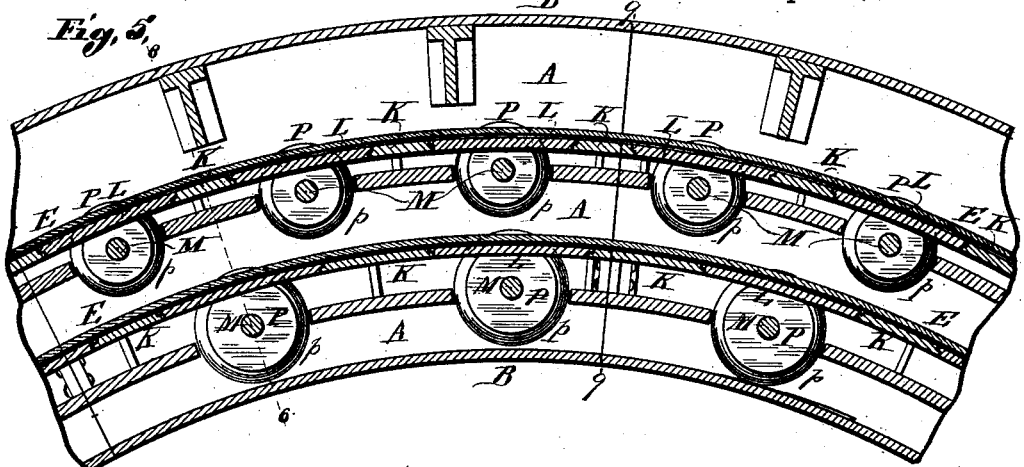
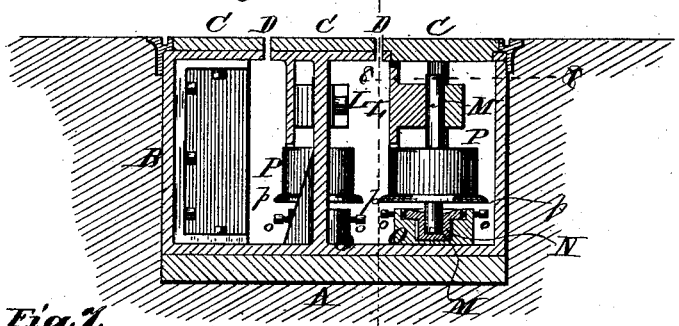
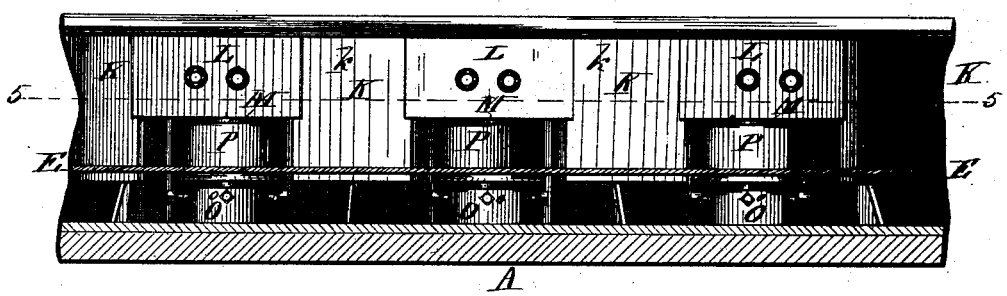
Attest:
H. B. Knight
Edmund Star.
Inventor:
Richard P. Walsh.
By Knight Bro.

(No Model.)  R. P. WALSH.  4 Sheets—Sheet 3.
CABLE RAILWAY.
No. 360,742.  Patented Apr. 5, 1887.
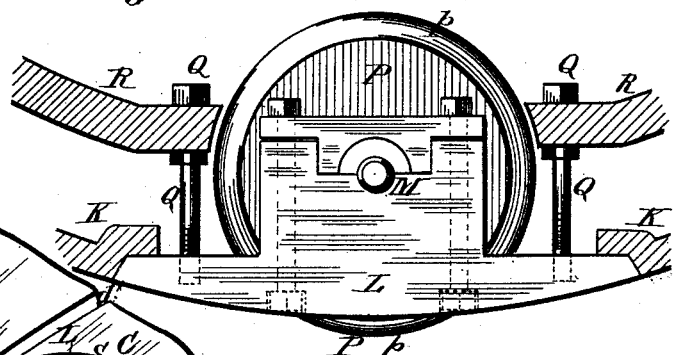
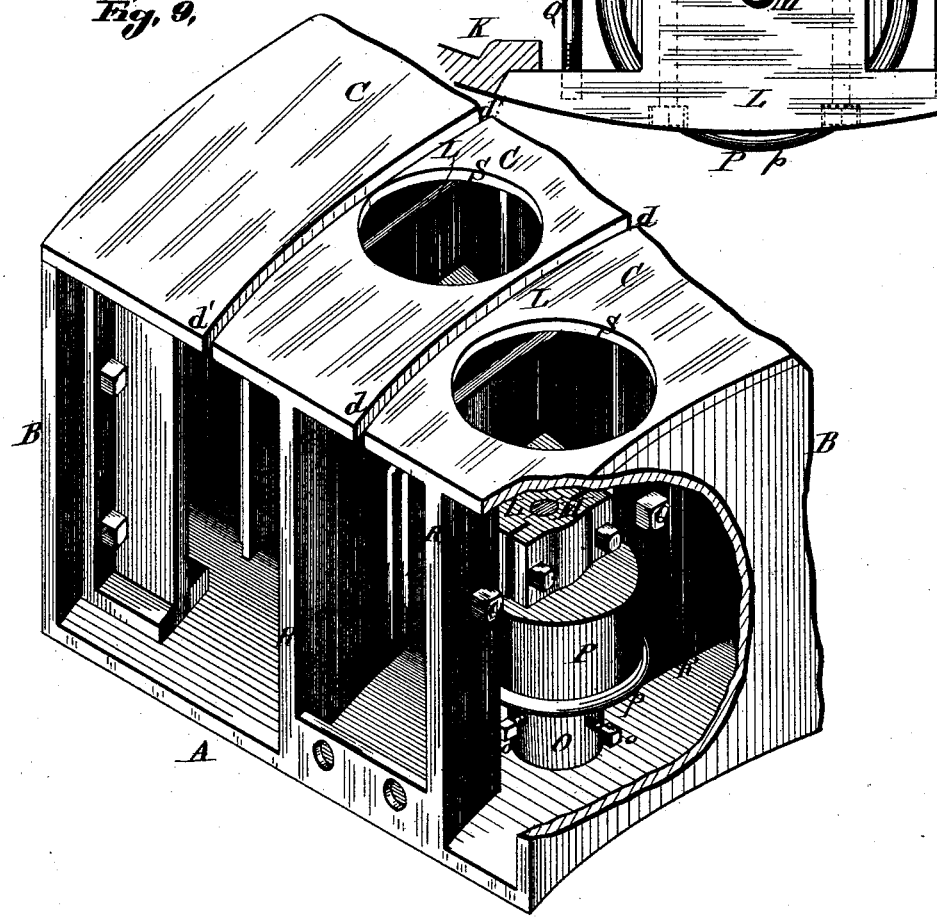
Attest:
H. Knight
Edward Otis
Inventor:
Richard P. Walsh
By Knight Bros.
Attys.

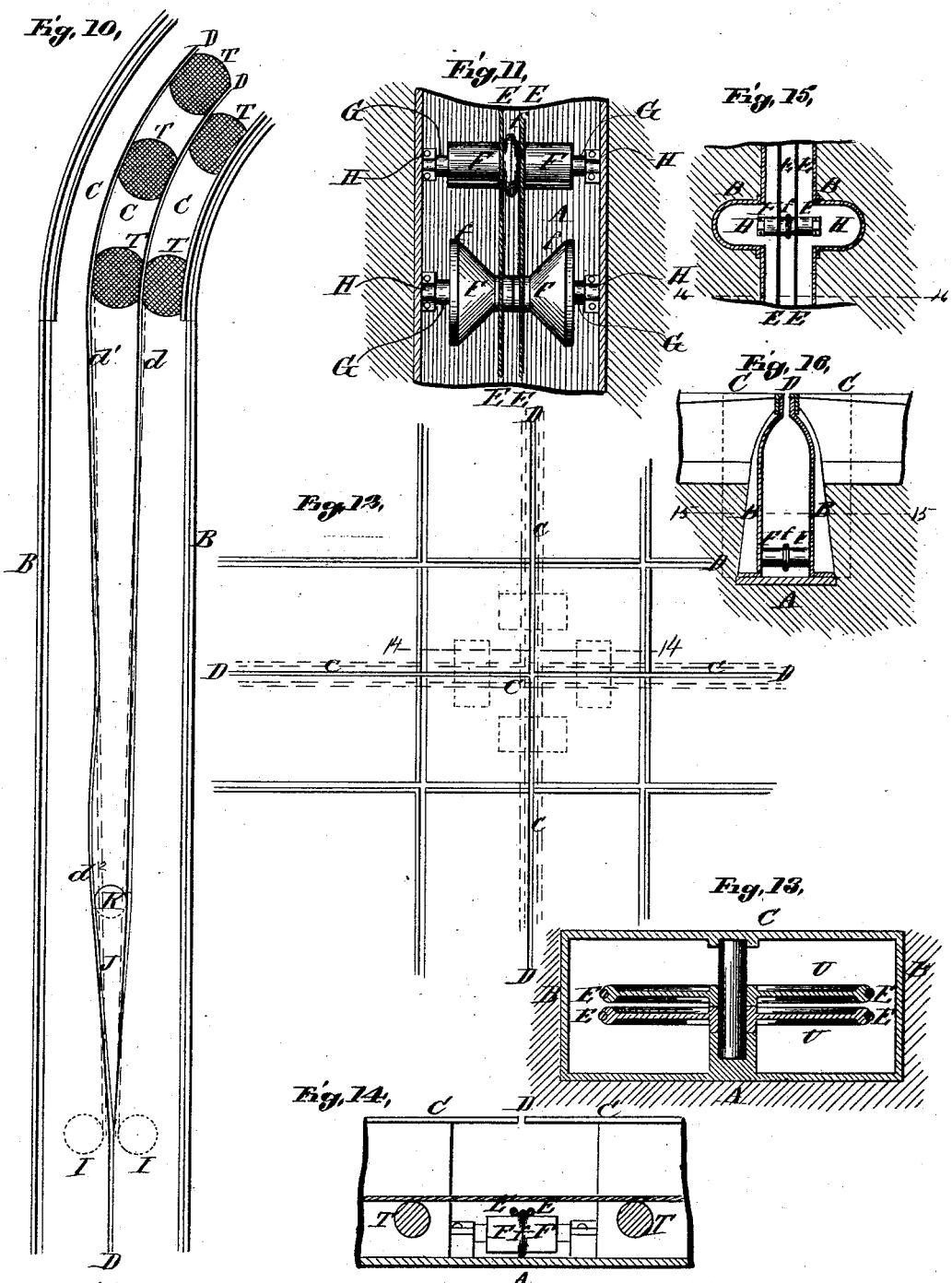

UNITED STATES PATENT OFFICE.

RICHARD P. WALSH, OF ST. LOUIS, MISSOURI, ASSIGNOR OF ONE-FOURTH TO MIDDLETON D. DEGGE, OF SAME PLACE.

CABLE RAILWAY.

SPECIFICATION forming part of Letters Patent No. 360,742, dated April 5, 1887.

Application filed October 7, 1886. Serial No. 215,590. (No model.)

*To all whom it may concern:*

Be it known that I, RICHARD P. WALSH, of the city of St. Louis, in the State of Missouri, have invented a certain new and useful Improvement in Cable Railways, of which the following is a full, clear, and exact description, reference being had to the accompanying drawings, forming part of this specification, and in which—

Figure 1 is a top view of part of a curve. Fig. 2 is a view of a similar part with the covers removed. Fig. 3 is a vertical transverse section of the track at 3 3, Fig. 1. Fig. 4 is a longitudinal section of the top plates at 4 4, Fig. 1. Fig. 5 is a horizontal section at 5 5, Fig. 7. Fig. 6 is a transverse vertical section at 6 6, Fig. 5. Fig. 7 is a vertical longitudinal section at 7 7, Fig. 6. Fig. 8 is a top view of one of the side-bearing pulleys, showing its journal-bearings, part of the frame being shown in horizontal section at 8 8, Fig. 6. Fig. 9 is an enlarged detail end perspective view of one section of the conduit at 9 9, Fig. 5. Fig. 10 is a top view showing the approach to a curve. Fig. 11 is a top view of two of the pulleys on which the cable runs. Fig. 12 is a plan of a crossing. Fig. 13 is a vertical section showing the end-bearing cable-pulleys. Fig. 14 is a vertical transverse section at 14 14, Fig. 12. Fig. 15 is a horizontal section at 15 15, Fig. 16. Fig. 16 is a transverse vertical section at 16 16, Fig. 15.

The conduit is constructed to receive two cables, but not so that they can be used at the same time by the same car, for at the curves each cable has its own system of side-bearing pulleys, &c.

The conduit has a bottom, A, sides B, and a top, C, through which the grip-slot D is made. In the main part of the line the grip-slot is single, whereas in the curves there are two grip-slots, D, one for each of the cables E. In the main or straight part of the line the cables are supported on two pulleys, F F, which turn loose on the same arbor G, the arbor being fixed by clips H at the ends or turning in boxes H at the ends, if preferred. The two cable-pulleys F are shown in Fig. 11 with an enlargement, $f$, alternately at the inner and outer ends. It is necessary that the pulleys, which support the respective cables shall have capacity for independent rotation, to allow one of the cables to remain at rest while the other is running, or to allow the cables to run at different speeds. It will be seen that if two cables in the same conduit are run at different speeds the car may be also run at different speeds by disconnecting the grip from one cable and connecting it with another.

As the track approaches the curve, the grip-slot D separates into two branches, which are marked $d\ d'$, the former being the inner and the latter the outer branch. The cables E also separate, and each has its proper system of side-bearing pulleys; but as they are of similar construction, a description of one system will equally apply to the other. At the point of separation the cables run between side-bearing pulleys, whose position is indicated by dotted circles at I, Fig. 10.

J is a switch-tongue, turning on a pivot, K'. By means of this tongue the grip may be carried into either of the slots $d$ or $d'$. The branch $d'$ has an outward bend, $d^2$, whose purpose will now be described. This conduit is particularly intended for use with a cable-grip having two jaws, one at each side. Now, in running around a curve it will be seen that the cable should be carried by the jaw nearer the inside of the curve, to cause the smallest amount of strain upon the cable and the other parts. Now, suppose the grip is running toward the curve into the branch $d'$ of the slot, and the cable is in the grip-jaw next the outer side of the curve. Just before the grip reaches the bend $d^2$ the cable is discharged from the outer jaw by a suitable ejector carried by the grip. When the grip-shank comes in contact with the curve, it is deflected to such an extent as to be completely beyond the cable, and when the curve allows it to come back into line the inner jaw takes the cable. The style of grip intended to be used is made the subject of an application for patent of even date herewith.

The construction of the side-bearing pulleys and plates is clearly shown in Figs. 8 and 9.

K are fixed vertical guides, which are curved upon the outer side, $k$, and are rabbeted at the ends to fit the ends of the guide-blocks L, in which the upper ends of the pulley-shafts M have bearing. The lower ends of these shafts M are stepped in boxes N, set in recesses of stop-blocks O, in which they may be adjusted by set-screws o. The pulleys are shown at P. These have at bottom a flange, p, to keep the cable from running off. The blocks L are not intended to give bearing to the cable, but only to the side of the grip, whereas the fixed guides K may give side bearing to the cable in case a pulley gives way or is deeply cut by the cable. The blocks are secured by bolts Q to the upright web R.

Access is had to the interior of the conduit through holes S in the top and sides, closed by covers T.

U U are the grooved wheels around which the cables are carried at the end of the line.

I claim as my invention—

1. In a cable railway, the combination, with a pair of cables running in the same direction, of a conduit having a single grip-slot for a portion of its length and a pair of slots at the curves, and a separate and distinct system of cable supporting and guiding pulleys for carrying each cable beneath its slot at the curves, substantially as set forth.

2. A conduit for a cable railway, having provision for support of alternate cables arranged to run in the same direction, and having a single grip-slot through part of its length and two grip-slots in another part, one for each cable, and both connecting with the single grip-slot of the other part.

3. A conduit for a cable railway, having provision for support of alternate cables arranged to run in the same direction, and having a single grip-slot through part of its length, communicating with two grip-slots, one for each cable, and a switch-tongue for the direction of the grip to either of the two slots, substantially as set forth.

4. In a cable railway, the combination, with the cable, of the supporting-rollers F F, placed in line with each other, with their axes parallel, each of said rollers having at one end a flange, $f$, the flanges alternating upon opposite sides of the cable, substantially as set forth.

5. The combination of the single grip-slot D, branch grip-slots $d\ d'$, and curved portion $d^2$, substantially as and for the purpose set forth.

6. The combination, with the fixed vertical guides K, rabbeted at the ends, and the guide-blocks L, of the guide-pulleys P and shafts M, having bearing at their upper ends in said blocks, substantially as set forth.

7. The combination, with the upright web R, of the guide-blocks L and the guide-pulleys P, having the upper extremities of their shafts journaled in said blocks, substantially as set forth.

8. The combination, with the vertical web R, the guides K, having rabbeted ends, and the guide-pulleys P, of the blocks L, fitting the rabbeted ends of said guides and affording bearing for the upper ends of the shafts of said pulleys, and the bolts Q, connecting said blocks with the web R, substantially as set forth.

RICHARD P. WALSH.

Witnesses:
SAML. KNIGHT,
EDW. S. KNIGHT.